Patented Aug. 25, 1953

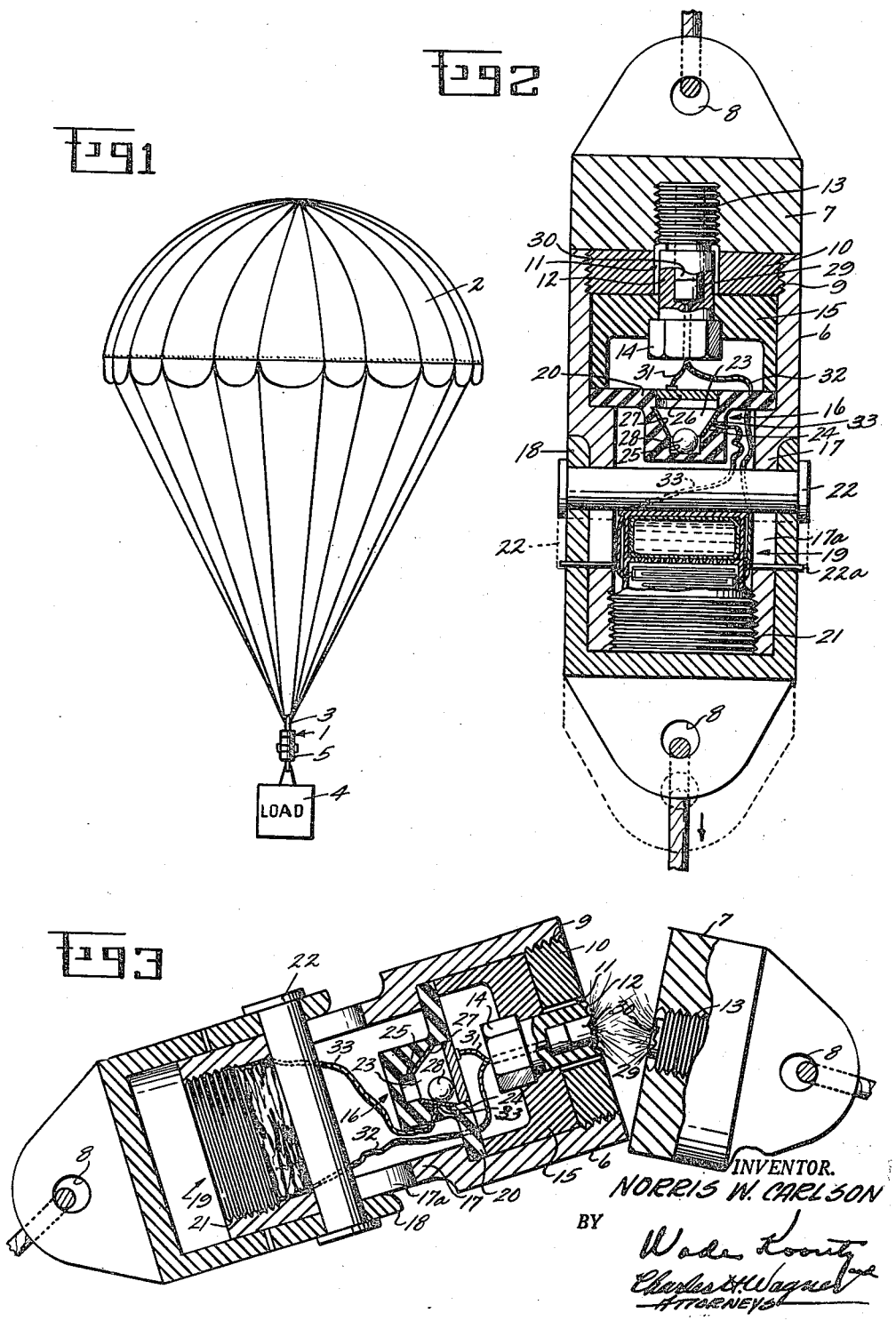

2,650,127

UNITED STATES PATENT OFFICE 2,650,127

PARACHUTE LOAD RELEASE

Norris W. Carlson, Dayton, Ohio

Application April 17, 1951, Serial No. 221,491

6 Claims. (Cl. 294—83)

(Granted under Title 35, U. S. Code (1952), sec. 266)

This invention described herein may be manufactured and used by or for the United States Government for governmental purposes without payment to me of any royalty thereon.

This invention relates to an improved automatic release means for automatically releasing a parachute from its suspended load shortly after the contact of the suspended load with the ground, and includes time delay means which are operable by the initial opening shock of the parachute after its release from an airplane to condition the automatic release means for subsequently disconnecting the parachute from the load when the load becomes supported by the ground and the sustaining pull of the parachute is no longer effective, or the pull of the parachute is in a predetermined inclined direction.

The release device includes an elongated body having a separable end portion connected to the body at one end by a frangible connection, adapted to be connected to the parachute, with an explosive means to break the frangible connection and free the parachute from its suspended load, connected to the body at its other end. The device includes electrical energized means for firing the explosive means upon a predetermined degree of inclination of the elongated body out of a vertical position including a source of electrical energy or time delay activated battery device that is normally inactive while the parachute is packed, but is activated by the initial shock loading as the parachute opens, allowing a slight time delay following the opening of the parachute to permit the parachute and load to stabilize so that the pull between the parachute and the suspended load will be more uniform and in a general vertical direction. More specifically the time delay electrical current generating battery means comprises a casing having a frangible part for conditioning the activating means, or an electrolyte which will be released upon fracture of the frangible part and after a predetermined relative short time delay of several seconds activate the battery to generate an electrical current, the frangible means or container being interposed in the body of the release device and between the parachute and the load so as to be fractured when the parachute's initial sustaining tension is applied to the load as the parachute opens. The release means includes an explosive bolt connection between the upper separable end portion of the body and the lower body portion having a bursting charge therein, an electrical primer, and the gravity switch connected between the primer and the normally inactive current generating battery means, in which the gravity switch is normally maintained open during the descent of the parachute when the body is not excessively tilted but as soon as the parachute has reached the ground and the body of the release device or connection between the parachute and the load is tilted beyond a predetermined inclined angle, either because of wind carrying the parachute to one side of the deposited load, or because the descending parachute has collapsed and slackened the sustaining connection to the load so that the gravity switch device has been excessively tilted, the switch will close the firing circuit to the now activated battery device and fire the bursting charge to free the parachute from its connected load.

Other objects and advantages of the invention will become apparent in the following description taken in connection with the accompanying drawings in which like reference characters refer to like parts in the several figures.

Drawings

Fig. 1 is a somewhat diagrammatic elevational view illustrating a parachute in descent having my improved automatic load release device interposed in the connection between the parachute and a suspended load or cargo.

Fig. 2 is an enlarged vertical longitudinal sectional view through my improved automatic release device, showing the same in full lines in vertical position just before the same has been subject to its initial "shock" loading, due to the opening of the parachute. The dotted lines in this figure illustrate the position of the automatic load release device after the chute has opened and the release device has been subjected to the shock loading, causing the time delay current generating battery device to become activated after a few seconds delay so as to be conditioned to fire the bursting charge and release the parachute, when the load release device is subsequently tilted beyond a predetermined degree.

Fig. 3 is a vertical longitudinal sectional view, similar to Fig. 2, but illustrating the release after it has been tilted beyond the critical predetermined inclined angle, showing the gravity responsive switch device in circuit closing position and after the bursting charge has been fired to disconnect the parachute from its connected cargo or load.

In the drawings the reference numeral 1 indicates my improved automatic load release device generally. In Fig. 1 the reference numeral 2 denotes a conventional parachute attached at 3 to the upper end of the load release device with a load of cargo 4 attached to the lower end of the load release device 1 as indicated by the reference numeral 5.

Referring more particularly to Fig. 2 the load release device comprises an elongated hollow body 6 having a separable upper end portion 7, provided with an eye 8 which is connected to the parachute. The elongated body 6 is formed with a hollow cylindrical bore, internally threaded at its upper end as indicated at 9 to receive a retaining plate or disk 10 having a central opening 11 therethrough. An explosive bolt or frangible connection 12 extends through the opening 11 and secures the separable end portion 7 to the plate 15, secured in the upper end of the body 6.

The separable end portion 7 is threaded at 13 to receive the threaded end of the explosive bolt 12 while the head of the bolt 14 is seated in a cup-shaped cylindrical member 15 held in place by the disk 10. The lower end of the cup-shaped member 15 retains a gravity operated switch device 16 in position in the body 6. The lower portion of the body 6 is provided with a concentric cylindrical reduced portion 17 for receiving a cup-shaped slidable end portion 18 having the eye 8 formed thereon for connection with the load to be sustained by the parachute.

The slidable end portion 18 is provided with a transverse pin or rod 22, passing through vertical slots 17a formed in the reduced portion 17 of the body, so as to permit the slidable or telescopic end portion to have axial movement relative to the body. A reserve battery device 19 is positioned within the reduced end portion 17 as shown in Fig. 2 of the drawings in full lines and retained therein by the plate 21 threaded into the lower end of the reduced extension. In this position the cross bolt or rod 22 rests on the top of the battery 19 while the plate 21 supports the lower side of the battery 19 with the slidable end portion "collapsed." Small holes are drilled through the wall of the end portion and the reduced portion of the device to receive safety wires 22a preventing accidental axial movement of the slidable end portion tending to crush the battery device 19.

The gravity switch device comprises a disk member 20 preferably formed of insulating material and retained in place in the body 6 by the cup-shaped member 15. This disk member 20 is formed with a central opening 23 having an inwardly and downwardly inclined wall 24 terminating in a short vertical recess or pocket 25. A metallic closure plate 26 extends across the top of the opening 23 forming one terminal of the gravity switch device 16. The other terminal is formed by lining the inclined wall portion 24 with a metallic thimble or ring as indicated at 27. The contacting closure member comprises a metallic ball 28 seated freely in the vertical recess 25 when the body is in vertical position. Inclination of the body 6 beyond a predetermined angle permits the ball to leave the recess and establish contact between the closure plate 26 and the thimble 27 as shown in Fig. 3 in the drawings. The reserve battery device 19 comprises a crushable casing in which the plates of the battery are contained in dry condition with an electrolyte separated and retained in a frangible envelope so that when the electrolyte is released and allowed to envelop the plates the battery will become activated to generate the current. The electrolyte is thus preferably retained in a frangible container such as glass and located in the top of the battery casing so that when the upward portion of the body is secured to a parachute, and the attached load, due to initial opening of the parachute, breaks the safety wires 22a and jerks the slidable end portion 18 downwardly, the crossbar 22 attached thereto will move downwardly in the slots 17a crushing the top portion of the battery to release the electrolyte and cause the battery to become subsequently activated.

The activation of the battery does not occur immediately but after several seconds' time delay so that the parachute will have the opportunity to stabilize itself with the load and the release device will be positioned in a substantially vertical direction. The firing circuit includes a primer 29 located in the frangible bolt 12 adjacent the bursting charge 30, one electrical conductor from the primer, indicated at 31, being connected to the contact plate 26 of the gravity control switch device 16. The second electrical conductor from the primer 29 is indicated at 32 and is connected to one terminal of the time delay actuated battery element 19. The other terminal of the battery is connected to the inclined contact terminal or thimble 27 within the switch device 16 as indicated at 33.

Referring to Fig. 2 the operation of the device is as follows:

When a parachute is released from an aircraft, having the load release device interposed between the parachute and the load, and the chute opens, the initial shock loading pull between the upper part of the body attached to the parachute and the lower slidable portion 17 attached to the load is sufficient to shear the safety wires 22a and cause the lower portion 18 of the device to be drawn downwardly. The cross pin 22 extending across the top of the reserve battery device 19 is drawn downwardly to force the top of the battery case downwardly crushing the electrolyte container located within the battery. A time delay occurs between the release of the electrolyte and its activating effect on the plates of the battery. During this period the parachute has become stabilized so that the body 6 is not excessively inclined relative to the vertical, also sufficient time has elapsed for the circuit closing ball 28 to gravitate into the recess 25, opening the firing circuit to the explosive bolt device 12.

When the load reaches the ground the parachute will permit the release device to fall to an inclined position such as shown in Fig. 3. Since the battery has been activated the contact ball 28 will leave the recess, roll down the inclined contact member 27 into contact with the plate 26 closing the firing circuit. The closing of this circuit explodes the bursting charge 30 in the explosive bolt and breaks the bolt at the reduced portion as shown in the drawings, separating the end portion 7 from the body, thus freeing the parachute.

In the event that it is windy when the load touches the ground, the parachute will be blown laterally away from the load so as to draw the body member into the inclined position as shown in Fig. 3, and in the manner just described, the powder charge will be exploded to release the parachute from the load before the parachute has a chance to upset or drag the load.

I claim:

1. An automatic parachute load release device comprising an elongated body, a relatively movable end portion shiftable axially thereon at one end of the body, a separable end portion at the opposite end of the body, said shiftable and separable end portions having securing means thereon adapted to be connected to a parachute and to the cargo or load to be suspended and lowered by the parachute to interpose the load release device between the parachute and a supported load, frangible connecting means between the body and separable end portion for coupling the body and separable end portion together, explosive means within the frangible connecting means for breaking the frangible connection to free the separable end portion from the body, electrical firing means associated with said explosive means for exploding the same, a firing circuit connected to said firing means for energizing the electrical firing means to ignite the explosive means when the firing circuit is closed, and a time delay reserve type energized battery connected to said firing circuit to energize the same, said battery being normally inactive, and having means therein to generate an electric current after a predetermined time delay when the battery is crushed, said battery being interposed between the body and the relatively movable end portion to be crushed thereby incident to axial movement of the movable end portion relative to the body by relative pull between the parachute and the cargo or load when the parachute is released initially opens and becomes shock loaded, a gravity responsive normally open switch device within the body connected in said firing circuit having a normally generally vertical position during descent after the parachute has opened, said gravity responsive switch device including spaced electrical contacts connected in the firing circuit, and a gravity responsive contact member movable in the body normally from a spaced relation relative to at least one of the spaced contacts when the body is in a generally vertical position and within a predetermined inclined position of the body, to a circuit closing contacting relation with both of the contacts for closing the firing circuit when the body is tilted beyond said predetermined inclined position.

2. In an automatic parachute load release device, an elongated body, an end portion axially slidably on one end of the body, a separable portion for the opposite end of the body, frangible securing connecting means between the separable end portion and the body for securing the separable end portion to the body, an explosive charge in said frangible securing connecting means for breaking the said connecting means to disconnect the separable end portion from the body, electrical igniting means in the body for igniting the explosive charge, comprising a firing circuit, a time delay reserve battery for energizing the circuit, and a gravity controlled normally open switch device for closing the firing circuit, said reserve battery comprising a crushable case having positive and negative plates therein and an electrolyte therein in a separate frangible container, said battery being disposed between the body and the axially slidable end portion, abutment means on the body and on the slidable end portion for crushing engagement with the battery case at opposite sides thereof incident to axial movement of the slidable end portion away from the body to fracture the frangible container and free the electrolyte to activate the battery to energize said firing circuit after a predetermined time delay following the crushing of said frangible container, said gravity operated switch device comprising a lower vertical conical shaped contact member, an upper substantially horizontal contact member insulated from the conical contact member forming spaced switch terminal in the firing circuit, and a gravity ball contact member disposed in said switch device for movement from the bottom of the conical shaped contact when the body is in a vertical position to a position bridging said relatively insulated conical contact member and said horizontal contact member when the body is tilted a predetermined degree from the vertical.

3. An automatic parachute load release device for connection between a parachute and a load to be lowered by the parachute comprising an elongated body, a separate end portion at one end of the body and an axially slidable end portion on the other end of the body, one of said end portions having means adapted to be connected to the parachute and the other end portion having means adapted to be connected to the load to be suspended by the parachute, a reserve battery device within the body having a crushable casing, frangible electrolyte container means within the casing, an electrolyte retained in said frangible container means to be released when the casing is crushed to fracture the container, electrical current generating means within the crushable casing for generating an electrical current when the electrolyte is released and comes in contact with the current generating means when the casing is crushed to fracture the frangible container, said crushable casing being interposed between the body and the axially slidable end portion to be crushed therebetween by axial separating movement between the slidable end portion and the body incident to a predetermined pull between the parachute and the load, an explosive bolt connecting device connecting the separable end portion to the body including an explosive charge within the connecting device, electrical igniting means for said explosive charge, a firing circuit connecting the explosive igniting means to the reserve battery device, and a gravity switch device fixed within the body and connected in the firing circuit to control the same, including gravity actuated circuit closing means completing the firing circuit when the body is inclined from the vertical in excess of a predetermined degree of inclination.

4. An automatic parachute load release device comprising an elongated body having a longitudinal axis and relatively movable and separable end portions, one of said end portions being adapted to be connected to a parachute and the other end portion being adapted to be connected to a load to be sustained and lowered by the parachute, explosive bolt means connecting the separable end portion to the body having a bursting charge therein, an electrical firing circuit in the body including electrical igniting means for exploding said explosive bolt bursting charge to free the separable end portion from the body to free the parachute from its suspended load, a gravity switch device fixed in said body, and connected in the firing circuit, having gravity actuated circuit opening and closing means therein, maintaining the firing circuit open when the longitudinal axis of body is not tilted beyond a predetermined degree from the vertical, and maintain the firing circuit closed while the body is tilted beyond said predetermined degree from the vertical, said body having a concentric reduced cylindrical extension, the other of the end portions comprising a cylindrical body axially slidable on the cylindrical reduced extension of the body, a crossbar fixed diametrically across the interior of the cylindrical reduced portion of the body transverse to the axis thereof, said reduced cylindrical extension having diametrically opposite longitudinal slots formed in the wall thereof to receive the crossbar therethrough with the ends of the slots limiting axial movement of the said crossbar and the said movable end portions on the body, an end closure member for the end of the cylindrical reduced extension, forming a battery receiving portion between the crossbar and the end closure member, a normally inactive battery device interposed in the reduced extension between the crossbar and the end closure and connected in said firing circuit, initially resisting axial movement of the last mentioned end portion away from the separable end portion, to be activated by contact of the crossbar therewith incident to movement of the crossbar toward the end closure during movement of the end portion carrying the crossbar in said direction away from the separable end portion.

5. In an automatic parachute load release device, an elongated body having a nonseparable end portion at one end and a separable end portion at its opposite end, connecting means on one of said end portions for connection to a parachute, and connecting means on the other end portion for connection to a cargo or load to be suspended and lowered by the parachute for positioning the load release device in a vertical position between the parachute and the suspended load, frangible connecting means between the separable end portion and the body connecting the same together, explosive means for breaking the frangible connecting means upon explosion of the explosive means to free the separable end portion from the body, an electrical firing circuit in the body for exploding the explosive means, electrical energy supply means connected to the firing circuit for energizing the circuit, and a gravity operated switch means located in the body, connected in the firing circuit maintaining the firing circuit open when the elongated body is in a vertical position and closing the firing circuit when the body is inclined from said vertical position beyond a predetermined degree.

6. In an automatic parachute load release device, an elongated body having an axially movable end portion at one end movable between an initial position and an extended battery activating position and a separate end portion at the opposite end, means on one of said end portions for connection to a parachute, means on the other end portion for connection to a cargo or load to be suspended and lowered by the parachute with the load release device in a vertical position between the parachute and the load, frangible connecting means between the body and the separable end portion for securing the body and separable end portion together, explosive means in said frangible connecting means for breaking the frangible connecting means to free the separable end portion from the body, electrical means for exploding the explosive means comprising an electric firing circuit in said body connected to the explosive means, a gravity operated switch means carried by the body and connected in the firing circuit, including a fixed contact and a gravity operated switch contact member movable to interrupting the firing circuit when the body is in a substantially vertical position and close the firing circuit when the body is inclined from said vertical position beyond a predetermined degree, a normally inactive battery device connected in the firing circuit for energizing the firing circuit when the battery device is activated, and means operable by movement of the movable end portion axially away from the body, from its initial position to its battery activating position for activating said battery for energizing the firing circuit when said firing circuit is closed by said gravity operated switch means.

NORRIS W. CARLSON.

References Cited in the file of this patent

UNITED STATES PATENTS

| Number | Name | Date |
|---|---|---|
| 1,901,185 | Nelson | Mar. 14, 1933 |
| 2,415,086 | Detwiler | Feb. 4, 1947 |
| 2,473,050 | Camp | June 14, 1949 |
| 2,489,984 | Shoemaker | Nov. 29, 1949 |
| 2,499,012 | Welsh et al. | Feb. 28, 1950 |